(12) United States Patent
Liebemann et al.

(10) Patent No.: US 6,952,954 B2
(45) Date of Patent: Oct. 11, 2005

(54) TIRE SENSOR SYSTEM FOR CONTINUOUS MEASUREMENT OF THE TRANSMITTED FORCE AND THE COEFFICIENT OF FRICTION POTENTIAL $\mu$

(75) Inventors: Edwin Liebemann, Leonberg (DE); Dietmar Arndt, Kleinsachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 78 days.

(21) Appl. No.: 10/466,296
(22) PCT Filed: Sep. 20, 2002
(86) PCT No.: PCT/DE02/03550

§ 371 (c)(1),
(2), (4) Date: Jan. 14, 2004

(87) PCT Pub. No.: WO03/042018

PCT Pub. Date: May 22, 2003

(65) Prior Publication Data

US 2004/0112128 A1 Jun. 17, 2004

(30) Foreign Application Priority Data

Nov. 13, 2001 (DE) .......................................... 101 55 672

(51) Int. Cl.[7] ............................................. G01M 17/02
(52) U.S. Cl. ........................................ 73/146; 73/146.3
(58) Field of Search ................................. 73/146–146.8

(56) References Cited

U.S. PATENT DOCUMENTS

2002/0157746 A1   10/2002   Merino-Lopez et al.

FOREIGN PATENT DOCUMENTS

| DE | 100 25 502 | 11/2001 |
| EP | 0 937 615 | 8/1999 |
| FR | 2 803 248 | 7/2001 |
| WO | WO 93/25400 | 12/1993 |

*Primary Examiner*—William Oen
*Assistant Examiner*—Jermaine Jenkins
(74) *Attorney, Agent, or Firm*—Kenyon & Kenyon

(57) ABSTRACT

A tire sensor system for the continuous measurement of the transferred force and of the adhesive friction potential $\mu$, made up of a plurality of sensors situated on the outer circumferential surface of the tire, via which measured variables are picked off and may be supplied as signals to an analyzing unit via an antenna system, in the area of the outer circumferential surface of the tire, a plurality of individually identifiable sensors is situated in each sector that corresponds to the tire contact area, the sensors making it possible to measure mechanical stresses locally in each position of the tire even when it is standing still, thus making it possible to determine the instantaneous force distribution in the tire.

14 Claims, 2 Drawing Sheets

TIRE SENSOR SYSTEM FOR CONTINUOUS MEASUREMENT OF THE TRANSMITTED FORCE AND THE COEFFICIENT OF FRICTION POTENTIAL $\mu$

FIELD OF THE INVENTION

The present invention relates to a tire sensor system for the continuous measurement of the transferred force and of adhesive friction potential $\mu$, the tire sensor system being made up of a plurality of sensors situated on the outer circumferential surface of the tire, via which measured variables are picked off and may be supplied as signals to an analyzing unit via an antenna system.

BACKGROUND INFORMATION

The tires of vehicles represent an elastic link between the wheels and accordingly the vehicle, and the road surface. All the forces for driving the vehicle resulting from propulsion and braking, from changing direction and tracking are transferred frictionally via the tire contact area between the tire and the road surface. The force occurring during this transfer depends primarily on conventional parameters of the tires and the vehicle, however, this force is also determined by the wheel load effective at the moment and adhesive friction value $\mu$, which is subject to abrupt change as a function of weather and the condition of the road surface.

Since the tread element deformation of the tire and the sliding movements between the rubber of the tire and the road surface determine the friction, which makes the transfer of force from the tire to the road possible both in longitudinal and transverse direction, it is necessary to obtain information concerning the transferred force but also concerning the adhesive friction value $\mu$. Therefore, a conventional method is to measure the deformation of individual lug elements of the tire. Starting with the knowledge of the elastic properties of the tire or of the lug elements, it is thus possible to infer the force transferred by the particular lug element. At the same time, however, it is also possible to infer adhesive friction value $\mu$ by observing the deformation of a lug element, since during the passage of the particular lug elements of the tire over its wheel contact area on the road surface, local slip events constantly occur, which are a function of the available adhesion potential.

Sensors are conventionally used to obtain information concerning the transferred force and adhesive friction value $\mu$ of tires for vehicles. It is thus possible, for example, to measure the deformation of the lug elements of a tire by detecting the movement of a magnet attached there using Hall sensors. According to German Published Patent Application 100 25 502, sensors may be used that may be both capacitive and inductive to measure the deformation of the tread of the tire and accordingly the mechanical stresses in the area of the tire contact area by placing or embedding a plurality of sensors on the tread as well as within the tread elements of the tire. An antenna is assigned to the sensors to supply the measured variables obtained as signals to an analyzing unit. Since multiple sensors are constantly in the reception range of the antenna, it may be necessary to code the sensors in order to obtain specific information concerning the deformation in the tire contact area.

However, it has also been shown that despite the many conventional systems of sensors, even considering their design, an online measurement of the variables of interest with respect to the transferred force and adhesive friction value $\mu$ is not possible. Instead, to determine the transferred force and adhesive friction value $\mu$ of the tires, it is first necessary to depart from the tire contact surface, so that it is then possible, for example, to determine the force transferred in longitudinal direction using the aligned surface area under the curve of local stress in the lug element as a function of the distance covered. In doing so, it is possible to determine adhesive friction value $\mu$ from the specific curve shape, the stress extremes and the slope of the curve in the stress zero crossing in the tire rubber. Nonetheless, however, considerable difficulties result when measuring the transferred force and adhesive friction value $\mu$ at low speeds. When the vehicle is standing still, these measurements are not even possible.

SUMMARY OF THE INVENTION

The present invention relates to a tire sensor system for the continuous measurement of the transferred force and adhesive friction potential $\mu$, through which it is possible to detect the measured variables required for this not only at relatively high speeds of the rotating tire, but also at low speeds, and, when the tire is standing still, a real-time-capable, low-noise force and $\mu$-value measurement is possible without it being necessary to connect the sensors by wiring.

These features may be attained in that, in the area of the outer circumferential surface of the tire, a plurality of individually identifiable sensors is positioned in each sector, formed by subdividing the circumferential surface, corresponding to the tire contact area, the sensors making it possible to measure mechanical stresses locally in each position of the tire, even when it is standing still, thus making it possible to determine the instantaneous force distribution in the tire.

According to an exemplary embodiment of the present invention, it is not only possible to produce a curve for a rotating tire but also for a tire that is standing still by taking local measurements of the mechanical stresses, the curve being derived from the stress as a function of the path, from precisely as many measuring points as there are sensors situated in the particular sector of the outer circumferential surface of the tire corresponding to the particular tire contact area. A curve is fitted to the individual supporting interpolation nodes resulting from the number of sensors, it being possible to calculate the transferred force and adhesive friction potential $\mu$ from the curve's parameters.

Thus, the tire sensor system according to an exemplary embodiment of the present invention may make it possible to continuously measure both the transferred force as well as adhesive friction potential $\mu$, not only at all speeds of the rotating tire but also when the tire is standing still, making it, e.g., unnecessary to determine the transferred force and adhesive friction potential $\mu$ by observing the deformation of a single lug element after a complete passage of the lug element through the tire contact area. This also may eliminate distortions of the results caused, for example, by slight local uneven areas of the road surface, which previously could not always be avoided.

According to an exemplary embodiment of the present invention, if the circumference of the tire is approximately 2 m and the length of the tire contact area is 10 cm, 200 sensors may be situated on the outer circumferential surface of the tire, so that ten sensors, i.e., ten supporting interpolation nodes serving as measuring points for curve fitting, are assigned to each sector that corresponds to the tire contact area. This does not rule out the possibility of increasing the number of sensors assigned to a sector, for example, in the case of a larger tire contact area, in order to obtain more precise results when measuring the transferred force and adhesive friction potential $\mu$. However, it is also possible to reduce the number of sensors assigned to a sector if the tire has a relatively small circumference. This does not influence the occurrence of the effects provided by the present invention.

According to another exemplary embodiment of the present invention, the sensors may be made from a material whose electromagnetic properties may be changed by mechanical stresses, so that it is possible to change the hysteresis curve and accordingly the attenuation of the material as a function of these stresses. Although any material suitable for changing the electromagnetic properties of the material by mechanical stresses may be used as the material, gyrant stress impedance material may be suitable as the material for the sensors in order to obtain the intended change of the electromagnetic properties.

While considering this material, the sensors may be made of threads that are capable of being excited to oscillate electromagnetically under the influence of mechanical stresses so that they continue to oscillate at their natural frequency, which is a function of their length. In order to make it possible to identify the individual sensors assigned to each sector of the outer circumferential surface of the tire in this design of the sensors as threads, the length of the sensors designed as threads assigned to each sector may be varied so that the individual sensors are identifiable via the different frequencies of the response functions resulting from this. It is possible, for example, to situate the sensors designed as threads within each sector of the outer circumferential surface of the tire so that the length of the threads constantly decreases or increases, or it is also possible to create such a system in which a longer thread is alternatingly followed by a shorter thread.

To make it possible to make the measured variables determined by the sensors available even after they are transmitted by the antenna system if called by the analyzing unit, a memory unit is connected downstream from the receiving antenna, which makes the measured variables available on request. If an immediate provision of the measured variables is provided, the memory unit may be eliminated and the receiving antenna may transmit the measured variables to the analyzing unit immediately after receiving the signals.

An exemplary embodiment of the transmitting antenna of the antenna system may be achieved by situating it in the vicinity of the axis of the tire.

If fiber optic technology is used in the tire sensor system for the measurement of the transferred force and adhesive friction potential $\mu$ designed according to an exemplary embodiment of the present invention, both the transmitting and the receiving antennas of the antenna system may be made up of optoelectric converters.

Depending on the design of the antenna system, the transmitting antenna, for example, may have a lobe-shaped directional characteristic for transmitting signals, which encompasses the sensors situated on the outer circumferential surface of the tire and located in the tire contact area.

It is possible to use the tire sensor system designed and configured according to an example embodiment of the present invention to monitor the tire inflation pressure due to the fact that the compression travel of the tire and the length of the tire contact area are measurable.

BRIEF DESCRIPTION OF THE DRAWINGS

An exemplary embodiment of the present invention is explained in greater detail below with reference to the associated drawings.

DETAILED DESCRIPTION

Figure 1:
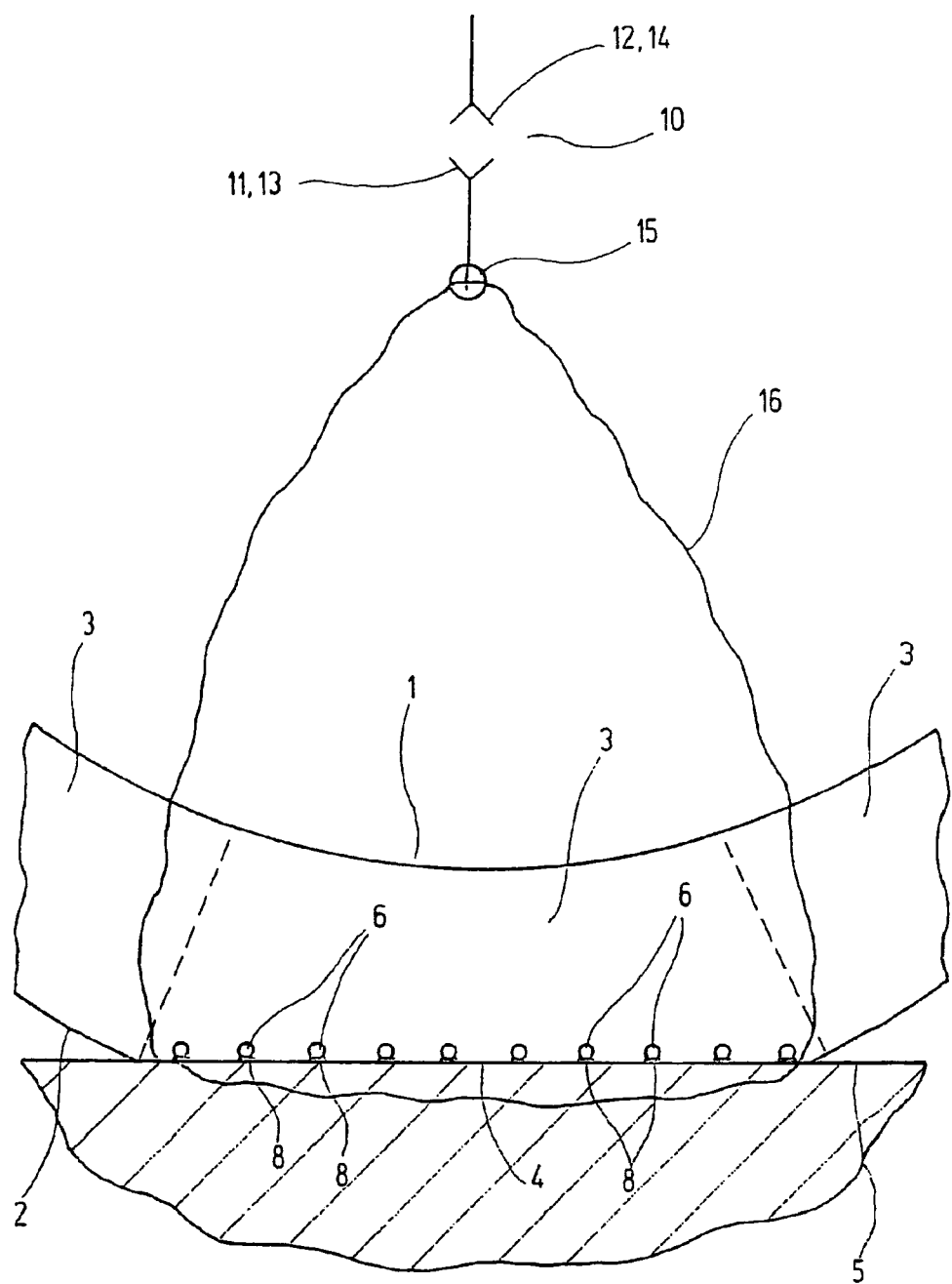
FIG. 1 shows a partial view of a tire of a vehicle in contact with a road surface having a tire sensor system according to an exemplary embodiment of the present invention assigned to the tire.

According to the exemplary embodiment of the present invention shown in FIG. 1, tire 1 of a vehicle is subdivided in the area of its outer circumferential surface 2 into sectors 3, each sector 3 corresponding to tire contact surface 4 of tire 1 on road surface 5. If, for example, a tire 1 is assumed to have a circumference of 2 m and a tire contact surface 4 having a length of 10 cm, there may be twenty sectors 3 in the area of outer circumferential surface 2 of tire 1.

Figure 3:
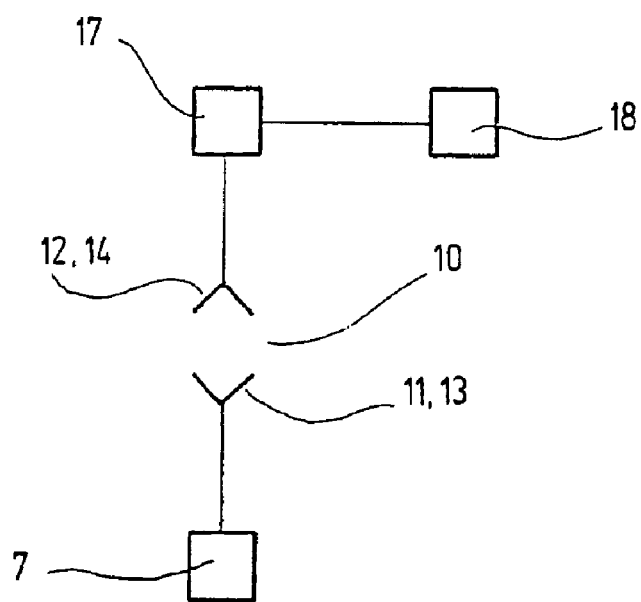
FIG. 3 shows a block diagram of the tire sensor system according to an exemplary embodiment of the present invention shown in FIG. 1.

In order to now obtain information concerning the transferred force and adhesive friction potential $\mu$ of tire 1 in each position of tire 1, not only at high or low speeds of rotating tire 1 but also when it is standing still, ten individually identifiable sensors 6 are situated in the area of outer circumferential surface 2 of tire 1 in each sector 3, it being possible to measure the mechanical stresses locally using these sensors, which may make up tire sensor system 7 (as shown, e.g., in FIG. 3). The configuration of ten sensors 6 in one sector 3 thus results in ten measuring points for the local measurement of the mechanical stresses, through which a curve is fitted, from the parameters of which it is possible to calculate the transferred force and adhesive friction potential $\mu$.

This is achieved due to the fact that sensors 6 may be made from a material having electromagnetic properties that may be changed by mechanical stresses, so that as a function of these stresses, it is possible to change the hysteresis curve and accordingly the attenuation of the material. The fact that sensors 6 are made from gyrant stress impedance material makes this possible. This means that sensors 6, under the influence of mechanical stresses resulting from the contact of tire 1 via tire contact surface 4 on road surface 5, are excited to oscillate electromagnetically and then continue to oscillate at their natural frequency.

Figure 2:
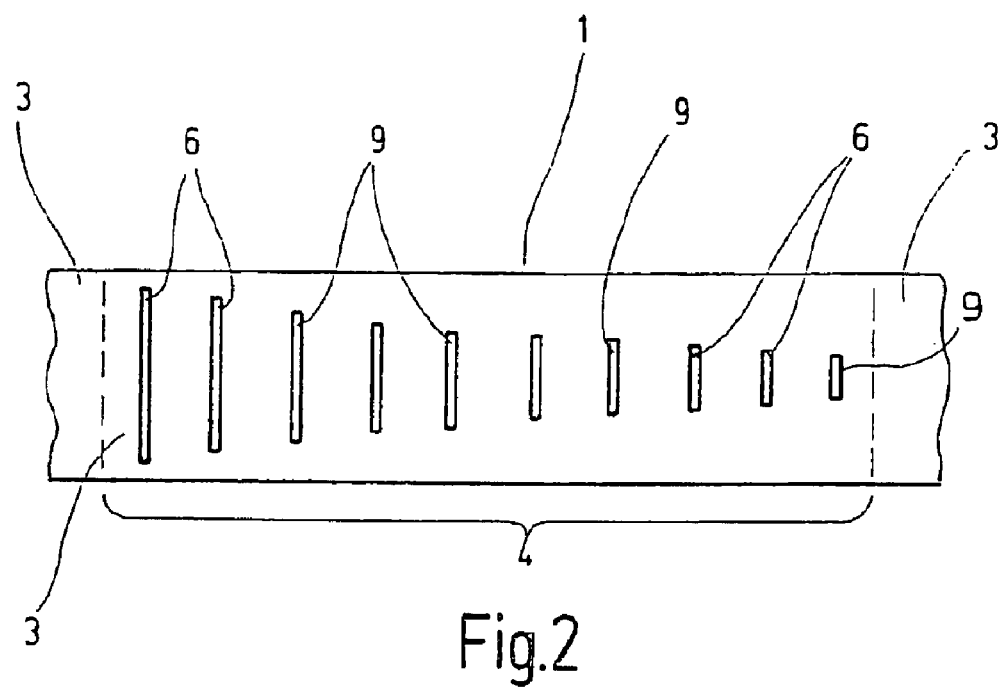
FIG. 2 shows a developed view of the tire shown in FIG. 1 in the area of its tire contact surface.

In order to obtain different frequencies, which may be desirable in order to make it possible to identify individual sensors 6 through the resulting response functions, they may be, as shown in FIG. 2, designed as threads 9 of varying length, sensors 6 within each sector 3 of outer circumferential surface 2 of tire 1 being situated in such a way that their lengths, i.e., that of threads 9, constantly diminishes.

According to the exemplary embodiment of the present invention shown in FIGS. 1 and 2, tire sensor system 7, made up of sensors 6, is assigned an antenna system 10, which is made up of a transmitting antenna 11 and a receiving antenna 12, which may be made up of optoelectric converters 13, 14. As shown in FIG. 1, transmitting antenna 11 is situated in the vicinity of axis 15 of tire 1 and has a lobe-shaped directional characteristic 16 for transmitting signals, which encompasses sensors 6, situated on outer circumferential surface 2 of tire 1 and located in tire contact area 4.

As shown in FIG. 3, the measured variables detected by sensors 6 of tire sensor system 7 may be supplied via antenna system 10 to a memory unit 17, which is connected downstream of receiving antenna 12. If called, the detected measured variables may be supplied to analyzing unit 18 by memory unit 17.

What is claimed is:

1. A tire sensor system for continuous measurement of transferred force and an adhesive friction potential, comprising:

a plurality of sensors arranged on an outer circumferential surface of a tire including a plurality of individually identifiable sensors arranged in each sector that corresponds to a tire contact area, the sensors configured to measure mechanical stresses locally in each position of the tire, including a standing still position, to determine an instantaneous force distribution in the tire; and an antenna system configured to supply measured variable from the sensors to an analyzing unit.

2. The tire sensor system according to claim 1, further comprising an arrangement configured to produce, during local measurement of the mechanical stresses, a curve from the mechanical stresses as a function of a path.

3. The tire sensor system according to claim 1, further comprising an arrangement configured to produce, during local measurement of the mechanical stresses, a curve from the mechanical stresses as a function of the path and from as many measured points as sensors arranged in a sector of the tire corresponding to a particular tire contact area.

4. The tire sensor system according to claim 3, further comprising an arrangement configured to fit the curve to individual supporting interpolation nodes from the number of sensors and to calculate the transferred force and the adhesive friction potential from parameters of the curve.

5. The tire sensor system according to claim 4, wherein a circumference of the tire is approximately 2 m and a length of the tire contact area is 10 cm, the plurality of sensors including 200 sensors arranged on the outer circumferential surface of the tire, ten sensors and ten supporting interpolation nodes arranged as measuring points for curve fitting assigned to each sector corresponding to the tire contact area.

6. The tire sensor system according to claim 1, wherein the sensors include a material having electromagnetic properties changeable by mechanical stresses so that a hysteresis curve and an attenuation of the material are changeable as a function of the mechanical stresses.

7. The tire sensor system according to claim 6, wherein the material of the sensors includes a gyrant stress impedance material.

8. The tire sensor system according to claim 7, wherein the sensors include threads excitable to oscillate electromagnetically under an influence of mechanical stresses to continue to oscillate at a natural frequency essentially as a function of a length.

9. The tire sensor system according to claim 8, wherein the length of each sensor arranged as threads assigned to each sector of the outer circumferential surface of the tire is varied so that individual sensors are identifiable by different frequencies of response functions.

10. The tire sensor system according to claim 9, further comprising a memory unit connected downstream from a transmitting antenna of the antenna system, the transmitting antenna configured to transmit measured variables determined by the sensors to the memory unit, the memory unit configured to make available the measured variable to the analyzing unit on request.

11. The tire sensor system according to claim 10, wherein the transmitting antenna of the antenna system is arranged in a vicinity of an axis of the tire.

12. The tire sensor system according to claim 11, wherein the transmitting antenna and a receiving antenna of the antenna system include optoelectric converters.

13. The tire sensor system according to claim 12, wherein the transmitting antenna includes a lobe-shaped directional characteristic for signal transmission that encompass the sensors arranged on the outer circumferential surface of the tire and located in the tire contact area.

14. The tire sensor system according to claim 1, wherein the tire sensor system is configured to measure a compression travel of the tire and a length of the tire contact area to monitor tire inflation pressure.

* * * * *